(12) United States Patent
Bidaut et al.

(10) Patent No.: US 11,078,800 B2
(45) Date of Patent: Aug. 3, 2021

(54) TURBOMACHINE ROTOR AND METHOD FOR PRODUCING SAME

(71) Applicant: MAN Energy Solutions SE, Augsburg (DE)

(72) Inventors: Yves Bidaut, Reutlingen (CH); Sascha Schob, Lupsingen (CH); Christian Gold, Zürich (CH)

(73) Assignee: MAN ENERGY SOLUTIONS SE, Augsburg (DE)

( * ) Notice: Subject to any disclaimer, the term of this patent is extended or adjusted under 35 U.S.C. 154(b) by 155 days.

(21) Appl. No.: 16/349,551

(22) PCT Filed: Nov. 13, 2017

(86) PCT No.: PCT/EP2017/079077
§ 371 (c)(1),
(2) Date: May 13, 2019

(87) PCT Pub. No.: WO2018/087370
PCT Pub. Date: May 17, 2018

(65) Prior Publication Data
US 2019/0264570 A1    Aug. 29, 2019

(30) Foreign Application Priority Data

Nov. 14, 2016    (DE) .......................... 102016222312.7

(51) Int. Cl.
*F01D 5/30*    (2006.01)
*B23P 15/00*    (2006.01)
*F01D 5/14*    (2006.01)

(52) U.S. Cl.
CPC .......... *F01D 5/3061* (2013.01); *B23P 15/006* (2013.01); *F01D 5/141* (2013.01);
(Continued)

(58) Field of Classification Search
CPC .. F01D 5/3061; F01D 5/141; F01D 2270/114; F01D 2230/237; F01D 2230/10; F01D 2230/238; B23P 15/006
See application file for complete search history.

(56) References Cited

U.S. PATENT DOCUMENTS 2,888,239 A * 5/1959 Slemmons .............. F01D 5/021
  416/213 R
3,590,454 A * 7/1971 Brass ..................... B23P 15/006
  29/889.21
(Continued)

FOREIGN PATENT DOCUMENTS

| EP | 1 785 590 | 5/2007 |
| JP | 2007-125590 | 5/2007 |

(Continued)

OTHER PUBLICATIONS

Office Action dated Jul. 30, 2020 issued in Korean Patent Application No. 10-2019-7016594.
(Continued)

*Primary Examiner* — J. Todd Newton
(74) *Attorney, Agent, or Firm* — Cozen O'Connor

(57) ABSTRACT

A turbomachine rotor having a radially inner hub element, a radially outer cover element, and rotor blades which extend between the hub element and the cover element and have rotor blade airfoils. The rotor blades are an integral component of the hub element and are bonded to the cover element according to a first alternative or are an integral component of the cover element and are bonded to the hub element according to a second alternative. The rotor blades have an integral socket adjacently to the cover element according to the first alternative or adjacently to the hub element according to the second alternative, and the rotor blades are bonded to the cover element according to the first
(Continued)

alternative or to the hub element according to the second alternative via the socket.

11 Claims, 1 Drawing Sheet

(52) U.S. Cl.
CPC .... *F05D 2230/10* (2013.01); *F05D 2230/237* (2013.01); *F05D 2230/238* (2013.01); *F05D 2270/114* (2013.01)

(56) References Cited

U.S. PATENT DOCUMENTS

| | | | |
|---|---|---|---|
| 8,727,729 | B2 | 5/2014 | Noronha et al. |
| 9,435,213 | B2 * | 9/2016 | Wunderle ............. F01D 11/005 |
| 9,815,134 | B2 * | 11/2017 | Yokoo ..................... C22C 38/02 |
| 10,197,067 | B2 * | 2/2019 | Ahn ....................... F04D 29/403 |
| 2008/0237195 | A1 * | 10/2008 | Iwasa ................... F04D 29/026 219/61 |
| 2011/0318183 | A1 | 12/2011 | Noronha |
| 2016/0237822 | A1 * | 8/2016 | Bischof .................. F01D 5/005 |
| 2016/0237894 | A1 * | 8/2016 | Kupratis ................... F02C 7/36 |
| 2019/0076970 | A1 * | 3/2019 | Machinchick ........ B23P 15/006 |
| 2019/0078449 | A1 * | 3/2019 | Machinchick ........ F04D 29/388 |
| 2019/0264570 | A1 * | 8/2019 | Bidaut .................... F01D 5/141 |

FOREIGN PATENT DOCUMENTS

| | | | | |
|---|---|---|---|---|
| JP | 2007-152549 | | 6/2007 | |
| KR | 2011 0073921 | | 6/2011 | |
| WO | WO-2011057621 | A1 * | 5/2011 | ......... B23K 20/1205 |
| WO | WO-2013093337 | A1 * | 6/2013 | ........... F01D 25/246 |

OTHER PUBLICATIONS

Office Action dated Jul. 20, 2020 issued in Japanese Patent Application No. 2019-514799.
Office Action dated Jul. 6, 2020 issued in India Patent Application No. 201947018412.
Office Action dated Mar. 23, 2020 issued in Japanese Patent Application No. 2019-514799.

* cited by examiner

TURBOMACHINE ROTOR AND METHOD FOR PRODUCING SAME

CROSS REFERENCE TO RELATED APPLICATIONS

This is a U.S. national stage of application No. PCT/EP2017/079077, filed on Nov. 13, 2017. Priority is claimed on German Application No. DE102016222312.7, filed Nov. 14, 2016, the content of which is incorporated herein by reference.

BACKGROUND OF THE INVENTION

1. Field of the Invention

The invention relates to a turbomachine rotor and a method for producing such a turbomachine rotor.

2. Description of the Prior Art

Turbomachines, such as turbines or compressors, comprise stator-side assemblies and rotor-side assemblies. The rotor-side assemblies of a turbomachine include the so-called turbomachine rotor, which comprises a radially inner hub element, moving blades which, emanating from the hub element, extend radially to the outside and in the case of a closed embodiment, a shroud element adjoining the moving blades radially outside. The blade leaves of the moving blades extend between the radially inner hub element and the radially outer shroud element of a closed turbomachine rotor.

Known closed turbomachine rotors are constructed such that according to a first alternative the moving blades are an integral part of the hub element and are connected to the shroud element in a firmly bonded manner or according to a second alternative the moving blades are an integral part of the shroud element and connected to the hub element in a firmly bonded manner.

In particular when the moving blades are an integral part of the hub element, the moving blades and the hub element form a monolithic assembly. In particular when, by contrast, the moving blades are an integral part of the shroud element, the moving blades and the shroud element form a monolithic assembly.

To increase the performance of a turbomachine, there is a need for operating the respective turbomachine rotor with increasingly higher rotational speed. However, turbomachine rotors known from practice cannot be operated with increasingly higher rotational speeds since the firmly bonded connection, in particular soldered connection, between the moving blades and according to the first alternative, the shroud element or according to the second alternative, the hub element, can fail with increasingly greater rotational speeds. There is therefore a need for a turbomachine rotor that can be operated with higher rotational speeds.

SUMMARY OF THE INVENTION

One aspect of the present invention is a new type of turbomachine rotor and a method for producing the same.

According to one aspect of the invention, the moving blades according to the first alternative comprise an integral base, via which the moving blades according to the first alternative are connected to the shroud element or according to the second alternative to the hub element in a firmly bonded manner.

By providing an integral base on the moving blades and through the firmly bonded connection between the base and according to the first alternative the shroud element or according to the second alternative the hub element, the respective firmly bonded connection can be improved, in particular stresses are reduced in the region of the bonded connection so that ultimately the turbomachine rotor can be operated with higher rotational speeds and the performance of the turbomachine thus increased.

According to an advantageous further development of the invention, the moving blades, in a transition region between the respective moving blade leaf and the respective base, have a transition radius which is between 0.5% and 2.5%, particularly preferably between 1.0% and 2.0% of an outer diameter of the turbomachine rotor. With such a transition radius between the moving blade leaf and the base, the strength of the respective firmly bonded connection and thus the maximum rotational speed of a turbomachine rotor can be particularly advantageously increased.

Preferentially, the hub element, the moving blades and the bases according to the first alternative or the shroud element, the moving blades and the bases according to the second alternative are formed in each case as integral and thus monolithic assemblies by milling, wherein according to the first alternative the moving blades and the shroud element or according to the second alternative the moving blades and the hub element are connected to one another at the bases of the moving blades by soldering. By way of this, a turbomachine rotor that can be operated with particularly high rotational speeds can be provided.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a turbomachine rotor, namely a so-called closed turbomachine rotor, in particular a closed turbomachine rotor of a turbine or of a compressor. Closed turbomachine rotors comprise a shroud element.

Figure 1:
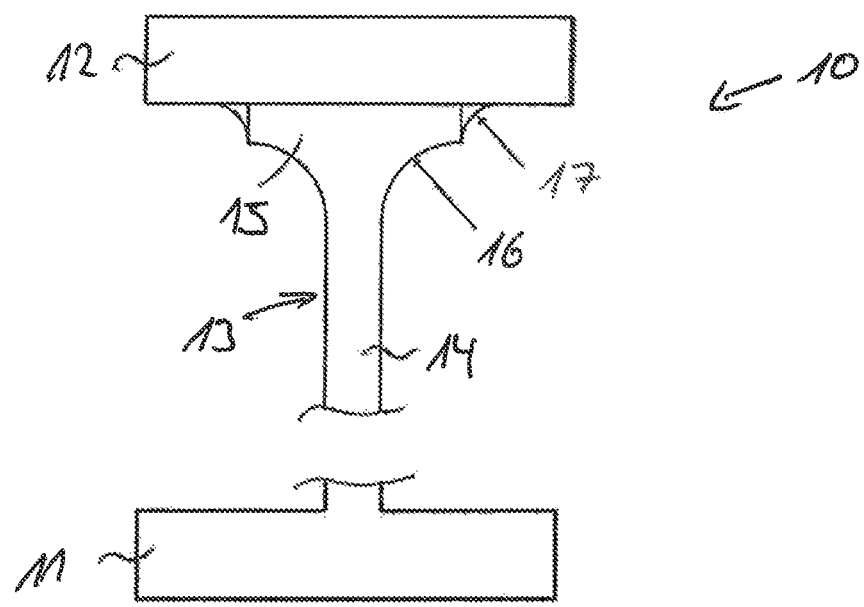
FIG. 1: is a highly schematised detail of a first turbomachine rotor.

FIG. 1 shows highly schematised an extract from a first turbomachine rotor 10 according to one aspect of the invention with a radially inner hub element 11, with a radially outer shroud element 12, and with moving blades 13 extending between the radially inner hub element 11 and the radially outer shroud element 12, each of which comprise a moving blade leaf 14. The radially inner hub element 11 is also referred to as hub disc and the radially outer shroud element 12 also as shroud disc.

As shown in FIG. 1, the moving blades 13 are an integral part of the hub element 11. The moving blades 13 and the hub element 11 accordingly form a monolithic assembly.

In FIG. 1, the moving blades 13 are connected to the shroud element 12 in a firmly bonded manner, in particular by soldering.

According to one aspect of the invention, the moving blades 13 shown in FIG. 1 comprise an integral and thus monolithic base 15 adjacently to the shroud element 12, i.e. at an end of the moving blades 13 facing the shroud element 12, via which the moving blades 13 are connected to the shroud element in a firmly bonded manner. Between the base 15 of the respective moving blade 13 and the shroud element 12, a firmly bonded connection 17 is thus formed, preferentially a soldered connection. FIG. 1 shows a radius in the region of the firmly bonded connection 17.

The hub element 11, the integral moving blades 13 of the hub element 11 and the integral bases 15 of the moving blades 13 are preferentially embodied as an integral assembly by milling. The hub element 11, the moving blades 13 and the bases 15 thus form a monolithic assembly.

In the transition region 16 between the respective moving blade leaf 14 and the respective base 15, the moving blades 13 have a defined transition radius which is greater than the radius in the region of the firmly bonded connection 17 and which amounts to between 0.5% and 2.5% of an outer diameter of the turbomachine rotor 10. This outer diameter of the turbomachine rotor 10 is defined by the greatest diameter of the shroud element 12.

Preferably, the transition radius in the transition region 16 amounts to between 0.5% and 2% or between 1.0% and 2.5%, particularly preferably to between 1.0% and 2.0% of this outer diameter of the turbomachine rotor 10.

Figure 2:
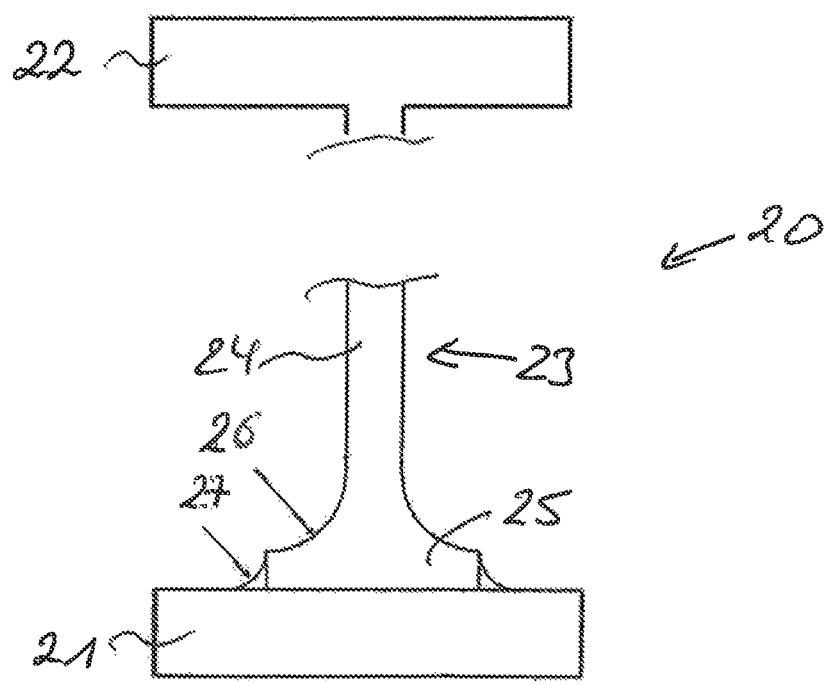
FIG. 2: is a highly schematised detail of a second turbomachine rotor.

FIG. 2 shows an alternative exemplary embodiment of a turbomachine rotor 20 with a radially inner hub element 21, a radially outer shroud element 22, and moving blades 23 extending between the radially inner hub element 21 and the radially outer hub element 22, which comprise moving blade leafs 24.

In FIG. 2, the moving blades 23 are an integral part of the shroud element 22 and connected to the hub element 21 in a firmly bonded manner, namely via bases 25, which represent an integral part of the respective moving blade 23. The moving blades 23, namely the moving blade leafs 24 of the same, comprise the respective base 25 adjacently to the hub element 21 or at an end located opposite the hub element 21, via which the moving blades 23 are connected to the hub element 21 in a firmly bonded manner.

In FIG. 2, the shroud element 22, the moving blades 23 and the bases 25 form an integral assembly, i.e. a monolithic assembly, which is preferentially formed by milling. By way of the bases 25 of the moving blades 23, this monolithic assembly is connected to the hub element 21 in a firmly bonded manner, in particular by soldering. FIG. 2 shows a radius in the region of the firmly bonded connection 27.

In the transition region 26 between the respective moving blade leaf 24 of the respective moving blade 23 and the respective base 25, a defined transition radius is formed, which is greater than the radius in the region of the firmly bonded connection 27 and which amounts to between 0.5% and 2.5%, preferably between 0.5% and 2.0%, or between 1.5% and 2.5%, particularly preferably between 1.0% and 2.0% of the outer diameter of the turbomachine rotor 20.

Furthermore, the invention present here comprises a method for producing such a turbomachine rotor 10 and 20.

According to the first alternative, a hub element 11 that is integrally bladed with the moving blades 13 or according to the second alternative a shroud element 22 that is integrally bladed with the moving blades 23 is provided in a first step.

According to the first alternative, a separate shroud element 12 or according to the second alternative a separate hub element 21 is provided in a second step. These assemblies are preferentially assemblies that have each been embodied by milling or additive manufacturing. According to the first alternative, hub element 11, moving blades 13 and base 15 form an integral monolithic assembly produced by milling. According to the second alternative, the shroud element 22, the moving blades 23 and the bases 25 form an integral, monolithic assembly produced by milling.

In a third step, hub element 11 or 21 and shroud element 12 or 22 are connected to one another in a firmly bonded manner via the bases 15 and 25 respectively of the moving blades 13 and 23 respectively, preferentially by soldering.

A transition radius in the respective transition region 16, preferentially formed by milling is greater than a radius in the region of the respective firmly bonded connection 17, 27. In the version of FIG. 1, the transition radius in the transition region 16 between base 15 and moving blade leaf 14 is thus greater than the radius in the connecting region between the base 15 and the shroud element 12. In the version of FIG. 2, the transition region in the transition region 26 between base 25 and moving blade leaf 24 is greater than the radius in the connecting region between the base 25 and the hub element 21.

With the turbomachine rotor 10, 20 according to the invention, the stresses can be reduced by way of the shaping. Furthermore, rotational speeds on the turbomachine rotor 10, 20 can be increased by way of which ultimately the performance of a turbomachine can be increased.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A turbomachine rotor, comprising:
    a radially inner hub element;
    a radially outer shroud element;
    a plurality of moving blades comprising moving blade leafs extending between the hub element and the shroud element having a first axial width,
    wherein the moving blades are one of:
        an integral part of the hub element and are connected to the shroud element in a bonded manner, the moving blades comprise a first integral base having a second axial width that is greater than the first axial width, adjacent to the shroud element, via which the moving blades are connected in a bonded manner to the shroud element or
        an integral part of the shroud element and are connected to the hub element in a bonded manner, the moving blades comprise a second integral base having a third axial width that is greater than the first axial width, adjacent to the hub element via which the moving blades are connected in a bonded manner to the hub element.

2. The turbomachine rotor according to claim 1, wherein one of the first integral base and the second integral base include a transition radius between 0.5% and 2.5% of an outer diameter of the turbomachine rotor.

3. The turbomachine rotor according to claim 2, wherein the transition radius is between 0.5% and 2.0% of the outer diameter of the turbomachine rotor.

4. The turbomachine rotor according to claim 2, wherein the transition radius is between 1.0% and 2.5% of the outer diameter of the turbomachine rotor.

5. The turbomachine rotor according to claim 4, wherein the transition radius is between 1.0% and 2.0% of the outer diameter of the turbomachine rotor.

6. The turbomachine rotor according to claim 2, wherein the transition radius in the respective transition region is greater than a radius in a region of a respective bonded connection.

7. The turbomachine rotor according to claim 1, wherein the one of:
the hub element, the moving blades, and the bases are produced as integral assemblies by milling or
the shroud element, the moving blades, and the bases are produced as integral assemblies by milling.

8. The turbomachine rotor according to claim 1, wherein the one of:
the moving blades and the shroud element are connected to one another in a bonded manner by soldering or
the moving blades and the hub element are connected to one another in a bonded manner by soldering.

9. A method for producing a turbomachine rotor, comprising:
providing a plurality of moving blades comprising moving blade leafs each having a first axial width;
providing one of:
a hub element that is integrally bonded with the moving blades and a separate shroud element or
a shroud element that is integrally bonded with the moving blades and a separate hub element,
connecting the separate hub element or the separate shroud element to the moving blades via respective bases base having a second axial width that is greater than the first axial width.

10. The method for producing the turbomachine rotor according to claim 9, wherein one of:
the hub element, the moving blades, and the bases are each provided as integral assemblies by milling or
the shroud element, the moving blades, and the bases are each provided as integral assemblies by milling.

11. The method for producing the turbomachine rotor according to claim 9, wherein one of:
the moving blades and the shroud element are each provided as integral assemblies by milling or
the moving blades and the hub element are connected to one another by soldering in a region of the respective bases of the moving blades.

\* \* \* \* \*